INVENTOR.
Paul Bliven

United States Patent Office 3,265,854
Patented August 9, 1966

3,265,854
LAMINATED CELLULAR METALLIC PANEL
Paul Bliven, 344 Cayuga St., Salinas, Calif.
Filed Nov. 26, 1963, Ser. No. 328,154
8 Claims. (Cl. 219—117)

The present invention is a continuation-in-part of application Serial Number 143,077, filed October 5, 1961, now abandoned.

The present invention relates to process, and the resulting article, for the construction of laminated metallic panels, and in more particular to cellular panels of the type having a core lamina made of sinuate strips of metal in face to face congruent registry, with each strip joined to its adjacent strips at consecutive nodal intervals alternating from face to face of such each strip, and having a face sheet of metal continuously welded to the strip edges delineating one or both faces of such core. By "continuous weld," it is meant that each of the strips forming the core has an edge which thruout all its length has been integrated with the face sheet by fusion therewith. This is to distinguish from "spot" and "tack" welding.

Similar panels are often called "honeycomb panels." However, applicant does not know of a panel of this type in which the face sheets have been joined to the edges of the core strips by continuous welds. The present practice is to braze the face sheets to the core in an oven while clamping the core, silver solder sheets, and face sheets together. The high temperature heating of all the components in an oven and the high wastage of the silver solder sheets and inert gas, usually used in the brazing process, is expensive, and results in warpage of the product and degradation of the materials used to form the product. Further, the resulting product disintegrates at the melting point of the brazing material. Another present practice is to secure the face sheets to the core by means of an adhesive. This process eliminates the disadvantages of brazing but includes all the limitations inherent in adhesives and in the particular one used.

Having in mind the above and other defects of the prior art, it is an object of the present invention to laminate cellular metallic panels by securing the laminae together in a continuous process by resistance welding using high frequency (H.F.) currents which exhibit the proximity effect. The use of such currents for resistance welding is disclosed in the patent of Gerald H. Peterson, Patent Number 3,004,136, October 10, 1961, and the prior art cited therein.

A further object of the invention is the construction of a laminated panel in which the laminae are secured together by continuous welds.

Another object of the invention is the construction of a laminated panel in which core strips are secured along an edge or edges thereof to a face sheet or sheets by continuous welds.

Further, it is an object of the invention to laminate cellular metallic panels in which a cellular core is formed by strips on edge and in face to face congruent registry by securing face sheets to such core by resistance welding using high frequency currents which exhibit the proximity effect and in which the edges of such core strips are continuously welded to such face sheets; and in which such lamination takes place continuously by the feeding of both core and face sheets into contact at a welding zone; and in which there is a simultaneous application and welding to the core of a face sheet to each of the two faces of the cellular core.

Somewhat more broadly, the invention relates to a process of forming and the product of such forming resulting in a laminae of a plain sheet of metal and a metal lamina formed with spaced apart elements having portions defining a discontinuous face, and with such portions of such elements contacted by and welded to a face of such sheet.

Particularly, it is an object of the present invention to achieve the above objects and to make such laminated cellular panels by the use of currents which exhibit the proximity effect due to phase opposition in the manner taught by Peterson, supra, and by the art cited therein.

In the achievement of the above objects and others that will be apparent hereinafter, all of which constitute the present invention, the cellular core may be made in diverse manners, one of which is disclosed in the patent to J. E. McKeen, 2,985,743, May 23, 1961. Such a core is continuously fed to a welding zone, and at such zone a face sheet is fed into contact and welded to each face of the core. The finished panel is continuously removed from the welding zone at the rate of feed thereto. In brief, in the preferred form of the invention, the face sheets, as they approach welding contact with the core in the welding zone, carry high frequency currents which are in phase, the current in one sheet being in phase with the current in the other sheet, and the core as it approaches welding contact with the face sheets carries a current which is in phase opposition to the inphase currents of the face sheets. Such currents will be surface currents and will exhibit the proximity effect. As the laminae approach contact, the current in the core will concentrate on the edges of core strips and the currents in the face sheets will concentrate on the faces of the sheets in opposition to the core strips' edges and in a pattern or patterns identical to the pattern made by the edges of core strips. This concentration of current heats the edges and faces just where needed for welding to take place upon contact between core and face sheet. The depth of heating is small with respect to the total mass of the sheets and core. Welding is effected upon contact between the sheets and the core, and the welds are immediately cooled as they pass from the welding zone. Such a process produces a laminated cellular panel in which the welds between core and face sheets are continuous welds. Further, the present process enables thinner core strips and thinner face sheets to be used in the formation of laminated panels than it is possible to use in the prior art brazing processes. This is due to the very localized heating. In the use of H.F. currents in phase opposition, arcing is negligible. The heating is only of a surface film. Arcing is negligible or nonexistent because of the phase opposition at contact. There is no "hot spot," as would occur if the face sheet and core currents were in phase. Thus it is believed that generally it will be possible to weld with H.F. currents in phase opposition, panels using much thinner sheets than would be possible with in-phase currents.

Another type of lamina that may be used for the core is disclosed in the turbulizer 10 of FIGURE 8 of the patent to Reinhold C. Zeidler, 3,083,662, April 2, 1963, wherein the flat tops 16a of the corrugations define a discontinuous face suitable to be contacted and welded to another lamina by the present method.

The process and product outlined above are hereinafter described in detail and illustrated in the accompanying drawing, in which.

Figure 1:
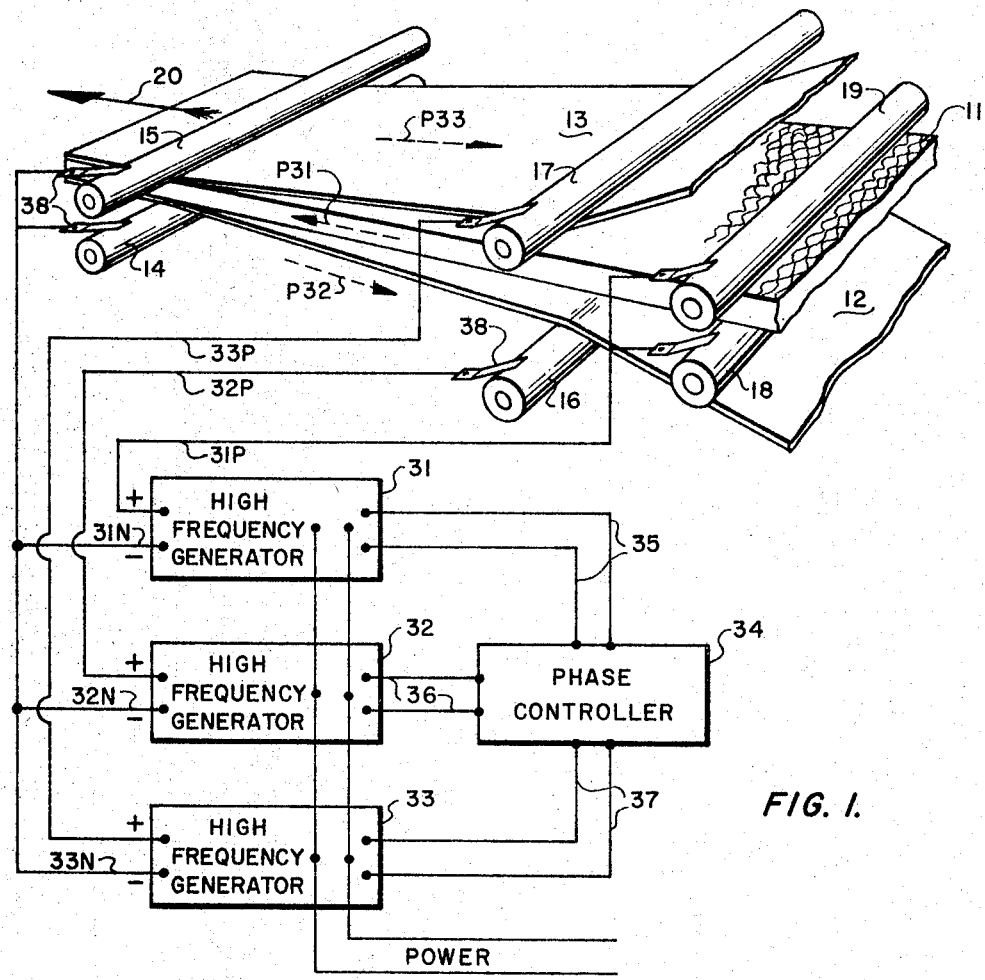
FIGURE 1 is a schematic showing, partly in perspective, of an apparatus, electrical circuits, and process for the formation of a laminated panel of the present invention.

In the showing of FIGURE 1, the core 11, the face sheets 12, 13, and various parallel guide-contact rollers 14, 15, 16, 17, 18, 19, are shown in perspective. No attempt has been made to show the source of the continuous core and continuous sheets or the final disposition of the continuously formed and flowing product. The cores may be constructed as disclosed in the McKeen or Zeidler patents, supra. The flow of the finished product and feed of the component laminae is from right to left in the drawing as indicated by the directional arrow 20. The welding zone extends between the final guide rolls 14, 15, one of which is in contact with each face of the laminated panel, and the sheet guide rolls 16, 17, one of which is in contact with each outside face of a sheet and spaced from the core. The spacing between the final and sheet guide rolls is a design or process factor and may be of the order of a foot. This depends upon convenience of access and design, and upon weight of materials, feed speed, value of current used, and other apparent factors. The sheet guides are spaced from the core so that there is a small angle, or V, between each sheet and the core with the apex at the final guides. This angle is another process factor as it may be varied as a function of the heating time. The smaller the angle, the greater the heating. The V angle is usually less than 10°. Core rollers 18, 19 serve to guide the core to the welding zone. The final rollers 14, 15, may be the drive rollers and the others driven thereby thru the core and sheets or by other positive means. Other guide means than the shown rollers and or sheet tension means may need be provided because of the electromagnetic field forces applied to the sheets and core by the currents flowing therein.

Figure 2:
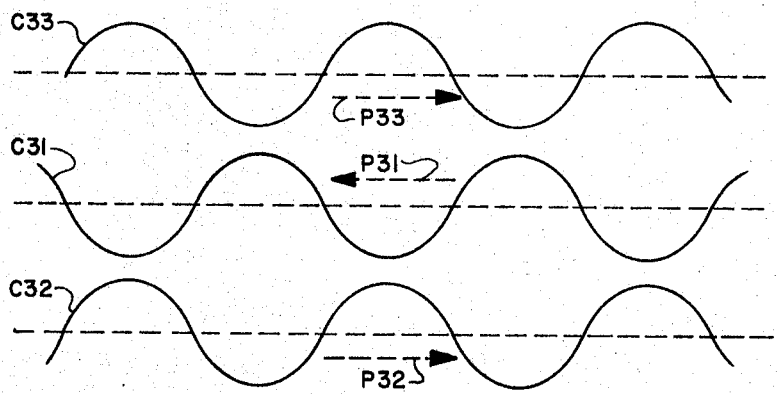
FIGURE 2 is an illustration of the phase relationships of the currents in the face sheets and core in the welding zone during the lamination of the panel of the present invention.

Welding currents flow in and on the sheets and the core in the welding zone. Circuit contacts, or electrodes, for these currents are provided by the various rollers shown. A separate power source 31, 32, 33, has been shown for each sheet and for the core. Each of these power sources is capable of producing high frequency current in the order of 450 kilocycles per second and of a capacity sufficient for the welding operation. A phase controller 34 is connected common to the three generators by separate leads 35, 36, 37, and determines the phase relationship therebetween so that the face sheet generators 32, 33, produce currents which are in phase with respect to each other, while the core generator 31, produces current which is 180° out of phase with the face sheet currents. This relationship is illustrated in FIGURE 2 where each of the three curves represents the current from one of the three generators. Each curve has been given the number of the generator which it represents with a prefix of C. Thus the curve C31 represents the current produced by the core generator 31, C32 that produced by the bottom sheet generator 32, and C33 that produced by the top sheet generator 33. Also, in FIGURES 1 and 2, the phase opposition has been indicated by the dotted arrows P31, P32, P33. Each curve by itself is not to scale for amplitude or frequency. However, combined they represent the phase relationship between them. The value of the core current would approximate that of the combined currents of the face sheets. Each generator is represented as having a positive and a negative lead to the welding zone. All the negative leads 31N, 32N, 33N, are combined to contacts engaging the final guide rolls 14, 15. The positive lead 31P of the core generator 31 goes to the core rolls 18, 19. The positive lead 32P of the bottom sheet generator 32 goes to the bottom sheet guide 16; and the positive lead 33P of the top sheet generator goes to the top sheet guide 17. The use of plus and minus signs is only a convention to indicate instantaneous conditions, and it might have been better to have indicated the core lead 31N as being positive instead of negative. It is the phase opposition that is the important and correct concept of the current relationships.

While the various leads are shown in contact with the various rolls by the conventional showing of brush 38, this showing is only for the purpose of indicating the positions along the sheets and core at which currents are applied. Contacts or electrodes separate from the rolls may be used. It is to be borne in mind that the current transfer will be the same as that in a condenser subject to the disclosed frequencies if there is a gap or resistance between a brush and roll, or roll and sheet or core, or between any other form of electrode and a sheet or core. These contacts should be designed with the above in mind. The contacts should, also, be designed so that there will be an even distribution of current across each of the laminae. This may involve the use of some form of wave guide or guides and the use of edge guards to prevent or reduce concentration of currents in the edges of the laminae. Also, all conductors and other apparatus are those suitable for use with currents of the frequencies described. Such are well known in the electrical field.

Shifts in current phase opposition from 180° opposition of the relative phase angle or angles between the currents in the core and sheets will increase the depth of heating, and such other phase relationships may be desirable with some materials and under some circumstances.

With the three generators 31, 32, 33, operating as desired and indicated, and with core material and face sheets flowing to and thru the welding zone as indicated in the drawings and as described, currents will flow thru the core and the face sheets with the sheet currents being in-phase and the core current out of phase with respect to the sheet currents as indicated by the relationship of the curves of FIGURE 2 and by the directional phase arrows P31, P32, P33. As each sheet approaches the apex of the V it makes with the core, the current in the sheet will concentrate on the face of the sheet in opposition to the core and in the pattern of the core. That is, the current will concentrate in opposition to the edges of the strips forming the core and will not be materially present in opposition to the openings in the core. Also, the current in the core will concentrate in the edges of the core strips. This means that the current in the core will divide itself between the two faces of the core as two face sheets are being simultaneously welded thereto, one face sheet to one core face. If only one core face were having a sheet welded thereto, all the core current would be concentrated in the strip edges forming such core face. The closer the laminae approach the apices of their V's, the more concentrated will be the current in the pattern of the core and the shallower will be its flow in the material, either core or sheet. Time and current values and other factors are set or regulated so that the contact areas are heated sufficiently so that fusion will take place on contact between core and face sheets. This contact takes place just before or at opposition of and between the final guide rolls 14, 15. These final rolls serve to bring the core and sheets together for fusion, to terminate the heating, and possibly to cool the welds to minimize warpage of the laminate and to prevent separation as might occur if the welds remained plastic past the pressure line of the final rolls, the V apex, the line or course of contact as such may be due to the configuration of core strip edges.

The continuously formed panel of FIGURE 1 may be cut to provide panels of any desired length. These will find use in many fields as they are very light in weight but strong in face compression and in bending. The welds are as strong as the material and will not deteriorate under high temperatures. Further, as tension is applied to the face sheets during the welding process, the panel has a smooth face, there is not a depression over each core opening. Also, the panel is smooth because there has not been a general heating of the components during fabrication.

The disclosed panel will find use in aeroplanes for floors and bulkheads, in buildings for floors, walls, and ceilings, and in many other places where strength and lightness are desired.

Having thus described my invention, the process of making the subject panel, and the product and its uses, I claim:

1. The process of laminating one surface of a metallic face sheet to a metallic core composed of sinuate metal strips in congruent face to face registry, with each strip joined to its adjacent strips at consecutive nodal intervals alternating from face to face of such each strip, edges of said strips forming a core surface, comprising: flowing said face sheet and core together so that they approach each other with their said surfaces in opposed substantially parallel relationship at a small extended angle, in such angle, causing a first high frequency current from a first source of current to flow in and along such face sheet, by causing a second high frequency current from a second source of current to flow in and along said core, establishing and relating said sources so that said currents are of sufficiently high frequency to produce skin effect so that each of said currents flows substantially entirely in a said surface, and so that said currents are related in frequency and in phase opposition so that due to said skin effect, due to their phase relationship, and due to the spaced proximity of such surfaces in extended relationship, said currents will exhibit a proximity effect to thereby localize the heating of said sheet and core to adjacent their such surfaces in opposed relationship in such angle so that as said surfaces flow together at the apex of said angle the sheet and core will be welded together.

2. The process of claim 1 in which the phase opposition is that of about 180° phase difference.

3. The process of claim 1 in which the depth of heating of the sheet and core opposed surfaces is varied as a function of said phase relationship.

4. The process of laminating which comprises flowing metallic laminae together so that opposed face surfaces thereof approach each other at an extended angle, one of said laminae being in the form of a thin sheet, and the other of said laminae being of a cellular construction in which said opposed face surface thereof is formed of spaced apart edges of the material forming such cellular construction, and causing each of said laminae to carry high frequency current which will exhibit surface and proximity effects so as to heat the opposed surfaces of such laminae along such edges and the portions of such sheet surface in opposition to such edges as distinguished from the bodies of such laminae, so that such edges and portions will be heated before they flow together and will fuse as such laminae flow together, and so that the concentration of such currents at such edges and portions will increase as such laminae approach each other.

5. The process of claim 4 in which such current is evenly distributed across such sheet remote from the place where such laminae flow together.

6. The process of laminating one surface of a metallic face sheet to a metallic core in which a surface of such core is formed of spaced apart edges of the material forming such core, comprising, flowing said face sheet and core together so that they approach each other with their said surfaces in opposed relationship at a small extended angle, in such angle, causing a first high frequency current from a first source of current to flow in and along such face sheet, by causing a second high frequency current from a second source of current to flow in and along said core, establishing and relating said sources so that said currents are of sufficiently high frequency to produce skin effect so that each of said currents flows substantially entirely in the surfaces of said sheet and core, and so that said currents are related in frequency and in phase opposition so that due to said skin effect, due to their phase relationship, and due to the spaced proximity of such surfaces in extended relationship, said currents will exhibit a proximity effect to thereby localize the heating of said core and sheet to such edges and the portions of such sheet surface in opposition to such edges as distinguished from the bodies of such core and sheet in opposed relationship in such angle so that as said surfaces flow together at the apex of said angle such edges and portions will be heated before they flow together and will fuse and be welded together as such laminae flow together.

7. The process of claim 6 in which such first current is evenly distributed across such sheet remote from the place where such laminae flow together.

8. The process of laminating that comprises flowing metallic laminae together so that opposed faces thereof approach each other at an extended angle, one of said lamina formed with spaced elements having first portions defining a discontinuous face forming one of said opposed faces, and the other of said lamina having second portions forming the other of said opposed faces, said second portions adapted to contact said first portions as said laminae flow together at the apex of said extended angle, and causing each of said laminae to carry high frequency current which will exhibit surface and proximity effects so as to heat the opposed faces of such laminae along such portions in opposition as distinguished from the bodies of such laminae, so that such portions will be heated before they flow together at the apex of such angle and will fuse as such laminae flow together, and so that the concentrations of such currents at such portions will increase as such laminae approach each other.

References Cited by the Examiner

UNITED STATES PATENTS

| | | | |
|---|---|---|---|
| 446,974 | 2/1891 | Lemp et al. | 219—78 |
| 2,056,563 | 10/1936 | Budd et al. | 219—107 |
| 2,299,776 | 10/1942 | Weightman | 219—78 |
| 3,004,136 | 10/1961 | Peterson | 219—67 |

RICHARD M. WOOD, *Primary Examiner.*